(12) United States Patent
Greener

(10) Patent No.: US 7,752,080 B1
(45) Date of Patent: Jul. 6, 2010

(54) SYSTEM AND METHOD FOR INTERACTIVELY PROVIDING SERVICES THROUGH A CENTRAL HUB

(76) Inventor: Jeremy D. Greener, 1353 S. Carmelina Ave., #119, West Los Angeles, CA (US) 90025

( * ) Notice: Subject to any disclaimer, the term of this patent is extended or adjusted under 35 U.S.C. 154(b) by 0 days.

(21) Appl. No.: 11/769,633

(22) Filed: Jun. 27, 2007

Related U.S. Application Data

(60) Provisional application No. 60/805,874, filed on Jun. 27, 2006.

(51) Int. Cl.
*G06Q 30/00* (2006.01)
(52) U.S. Cl. ........................................................ 705/26
(58) Field of Classification Search .................. 705/26, 705/27
See application file for complete search history.

(56) References Cited

U.S. PATENT DOCUMENTS

| | | | |
|---|---|---|---|
| 5,619,991 A | 4/1997 | Sloanne | |
| 5,718,247 A | 2/1998 | Frankel | |
| 5,819,267 A | 10/1998 | Uyama | |
| 6,829,587 B2 | 12/2004 | Stone et al. | |
| 6,865,540 B1 * | 3/2005 | Faber et al. | 705/8 |
| 6,961,713 B2 | 11/2005 | Perkowski | |
| 6,976,958 B2 | 12/2005 | Quy | |
| 6,980,962 B1 | 12/2005 | Arganbright et al. | |
| 7,203,477 B2 | 4/2007 | Coppinger et al. | |
| 7,283,974 B2 | 10/2007 | Katz et al. | |
| 7,297,111 B2 | 11/2007 | Iliff | |
| 7,319,979 B2 | 1/2008 | Thomas et al. | |
| 7,398,470 B2 | 7/2008 | Keane | |
| 7,412,048 B2 | 8/2008 | Gao et al. | |
| 2002/0016842 A1 * | 2/2002 | Eki | 709/226 |
| 2006/0116934 A1 | 6/2006 | Kurihara et al. | |
| 2006/0122850 A1 | 6/2006 | Ward et al. | |
| 2006/0156346 A1 | 7/2006 | Kulaowski | |
| 2006/0247959 A1 | 11/2006 | Oden | |
| 2007/0005435 A1 | 1/2007 | Murase et al. | |
| 2007/0136775 A1 | 6/2007 | MacKay et al. | |

* cited by examiner

*Primary Examiner*—Mila Airapetian
(74) *Attorney, Agent, or Firm*—Law Offices of David L. Hoffman

(57) ABSTRACT

An invention is provided for affording interaction between service consumers and service providers via centralized hub. The invention includes a service session scheduling component that schedules a service session between a service consumer and a selected service provider selected by the service consumer. The invention also includes a service management session delivery component capable of provisioning communication for the service session between the service consumer and the selected service provider. A service payment management component is also included that facilitates a payment from the service consumer to the service provider. In addition, the service payment management component facilitates a payment from the service provider to a system account.

81 Claims, 7 Drawing Sheets

US 7,752,080 B1

SYSTEM AND METHOD FOR INTERACTIVELY PROVIDING SERVICES THROUGH A CENTRAL HUB

CROSS REFERENCE TO RELATED APPLICATIONS

This application claims the benefit of U.S. Provisional Patent Application having Ser. No. 60/805,874, filed on Jun. 27, 2006, entitled "System and Method for Interactively Providing Services Through a Central Hub," which is hereby incorporated by reference.

BACKGROUND OF THE INVENTION

1. Field of the Invention

This invention relates generally to remote service providing, and more particularly to interactive service providing utilizing a central hub.

2. Description of the Related Art

Traditionally, service providers such as doctors and lawyers provided services in person, wherein the service provider met with the client and gathered a variety of information. The information was then utilized either to provide services immediately, as in the field of psychology, or saved for future use, as in the case of law, to assist the client.

The paradigm has been altered recently to allow service providers to provide services remotely. Here, service providers advertise their services on single discipline, service specific websites that allow clients to access each service provider remotely via the Internet. For example, Internet psychology websites have been created wherein patients can select a psychologist and contact them via email. These sites often allow the service provider, in this case the psychologist, to charge the patient and collect the fees electronically, for example using a credit card or electronic bank transfer.

For example, FIG. 1 is a diagram showing a conventional single discipline remote service model 100. The example of FIG. 1 illustrates a counseling remote service model 100 that includes a counseling website 102. The counseling website 102 is in communication with a plurality of therapists 104 and a patient 106, generally utilizing a limited form of electronic communication such as electronic mail (email).

As will be discussed in greater detail subsequently, the patient 106 must first find the counseling website 102 on the World Wide Web. If the counseling website is listed on a search engine, the patient 106 can perform a search using the search engine and perhaps find the counseling website 102. Otherwise, the patient 106 must find the counseling website 102 via another means, such as an advertisement or word of mouth.

Upon determining the location of the counseling website 102, the patient 106 can then contact a therapist 104 using the counseling website 102. Generally, this is accomplished via an email system, wherein the patient 106 completes a form at the counseling website 102, selects a particular therapist 104, and uses the counseling website 102 to send a contact email to the selected therapist 104. Thereafter, the therapist 104 and the patient 106 communicate via email to address the patient's 106 particular needs.

Unfortunately, as mentioned above, conventional service provider websites for service provision are very service specific, forcing potential customers, clients, and patients to find the specific website that provides the specific services that they need. In view of the foregoing, there is a need for systems and methods for allowing customers, clients, and patients to search for services and other offerings in a plurality of disciplines. The systems and methods should further allow scheduling, communication, management, and interactive service provisioning between consumers and service providers. In addition, the systems and methods should provide for payment to service providers providing services to customers, clients, or patients, as applicable, as well as provide for payment to that system through which service providers provide service and/or the system's providers.

SUMMARY OF THE INVENTION

Broadly speaking, embodiments of the present invention provide a service center hub that allows service consumers to search for service providers based on particular characteristics. Once found, the service center hub allows the service consumer to schedule, or request the scheduling of, service sessions with the selected service provider. For example, in one embodiment, a system is disclosed for providing interaction between service consumers and service providers via centralized hub. The system includes a service session scheduling component that schedules a service session between a service consumer and a selected service provider selected by the service consumer. The system also includes a service management session delivery component capable of provisioning communication for the service session between the service consumer and the selected service provider. A service payment management component is also included that facilitates a payment from the service consumer to the service provider. In addition, the service payment management component facilitates a payment from the service provider to a system account, which generally is an account utilized to collect payment from service providers. In this manner, the service provider receives payment for services rendered, and the service center hub receives payment from the service provider, such as for hub utilization. In one aspect, the service management session delivery component can be further capable of tracking a period of time of the service session, such as the period of time a service provider participates in the service session. In this aspect, the payment from the service consumer to the service provider can be based on the period of time. The system can also include a search and selection component that provides a plurality of service provider data to the service consumer in response to receiving a search request. In this case, the service provider is selected based on the plurality of service provider data. The search request generally includes a plurality of parameters defining characteristics of the requested service or service provider, and the plurality of service provider data includes information regarding service providers that have at least one of the characteristics defined in the search request. In one aspect, the payment from the service consumer to the service provider and the payment from the service provider to the system account are completed in one and/or two online transactions.

A method for providing interaction between service consumers and service providers via a centralized hub is disclosed in an additional embodiment of the present invention. The method includes scheduling a service session between a service consumer and a selected service provider selected by the service consumer. Communication for the service session is then provisioned between the service consumer and the selected service provider. When completed, a payment from the service consumer to the service provider is facilitated, and a payment from the service provider to the system account is facilitated.

In a further embodiment, a computer program embodied on a computer readable medium capable of providing interaction between service consumers and service providers via centralized hub is disclosed. The computer program includes a search and selection component that provides a plurality of service provider data to a service consumer in response to receiving a search request from the service consumer. In addition, a service session scheduling component is included that schedules a service session between a service consumer and a service provider selected by the service consumer in response to receiving a service provider selection from the service consumer. As above, the service provider is selected from the plurality of service provider data. Further included in the computer program is a service management session delivery component capable of provisioning communication for the service session between the service consumer and the selected service provider. The service management session delivery component also tracks a period of time during the service session. Further, a service payment management component is included that facilitates a payment from the service consumer to the service provider based on the tracked period of time. The service payment management component also facilitates a payment from the service provider to a system account. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an interactive service center hub that allows locating, selecting, managing, scheduling, providing communications for or pertaining to, and providing for the conveyance and collection of payments in any way related to the interactive provision of services. The service center hub of the exemplary embodiments of the present invention that are set forth herein allows customers, consumers, clients, patients, and other such service consumers to search for services and/or service providers and/or other offerings and thereafter to receive services from providers of services, whether they are professional service providers or non-professional service providers. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
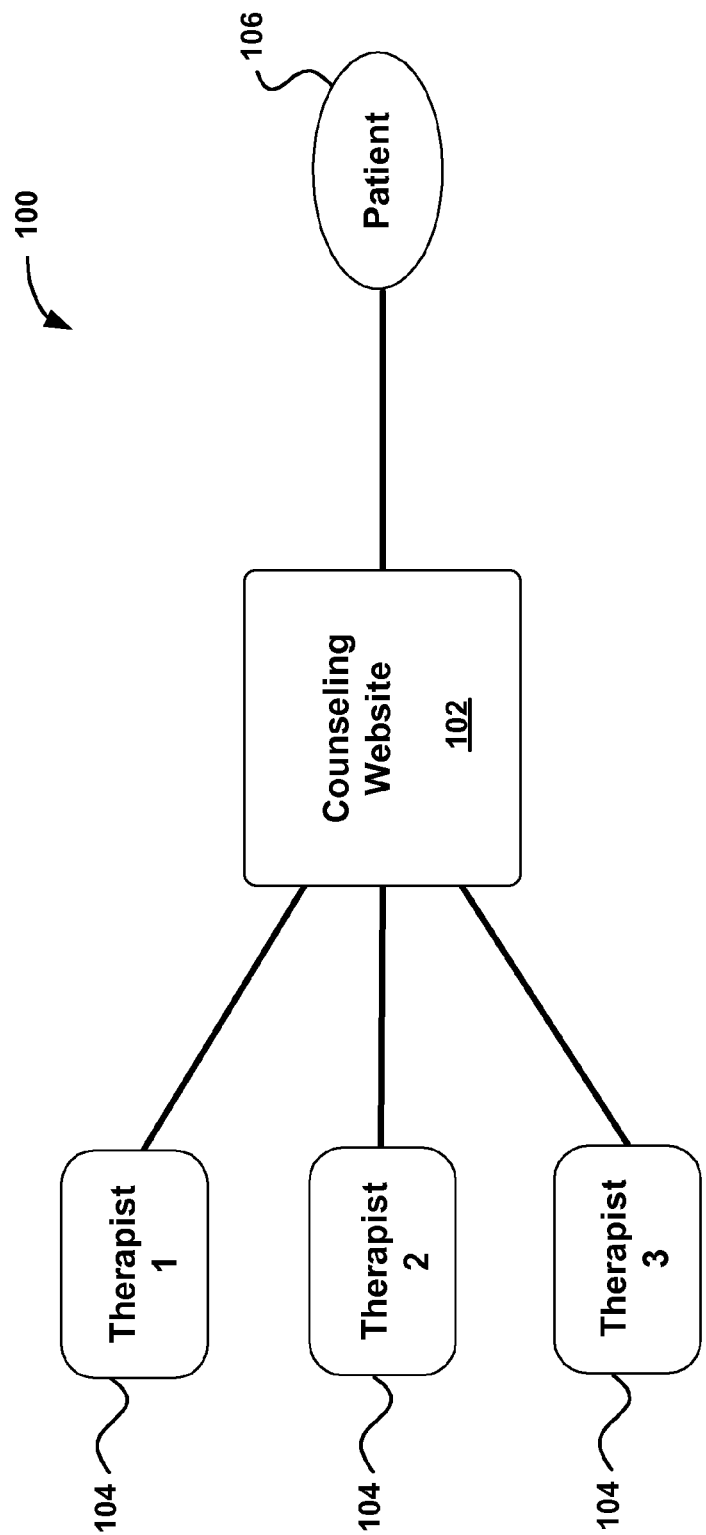
FIG. 1 is a diagram showing a conventional single discipline remote service model.
Figure 2A:
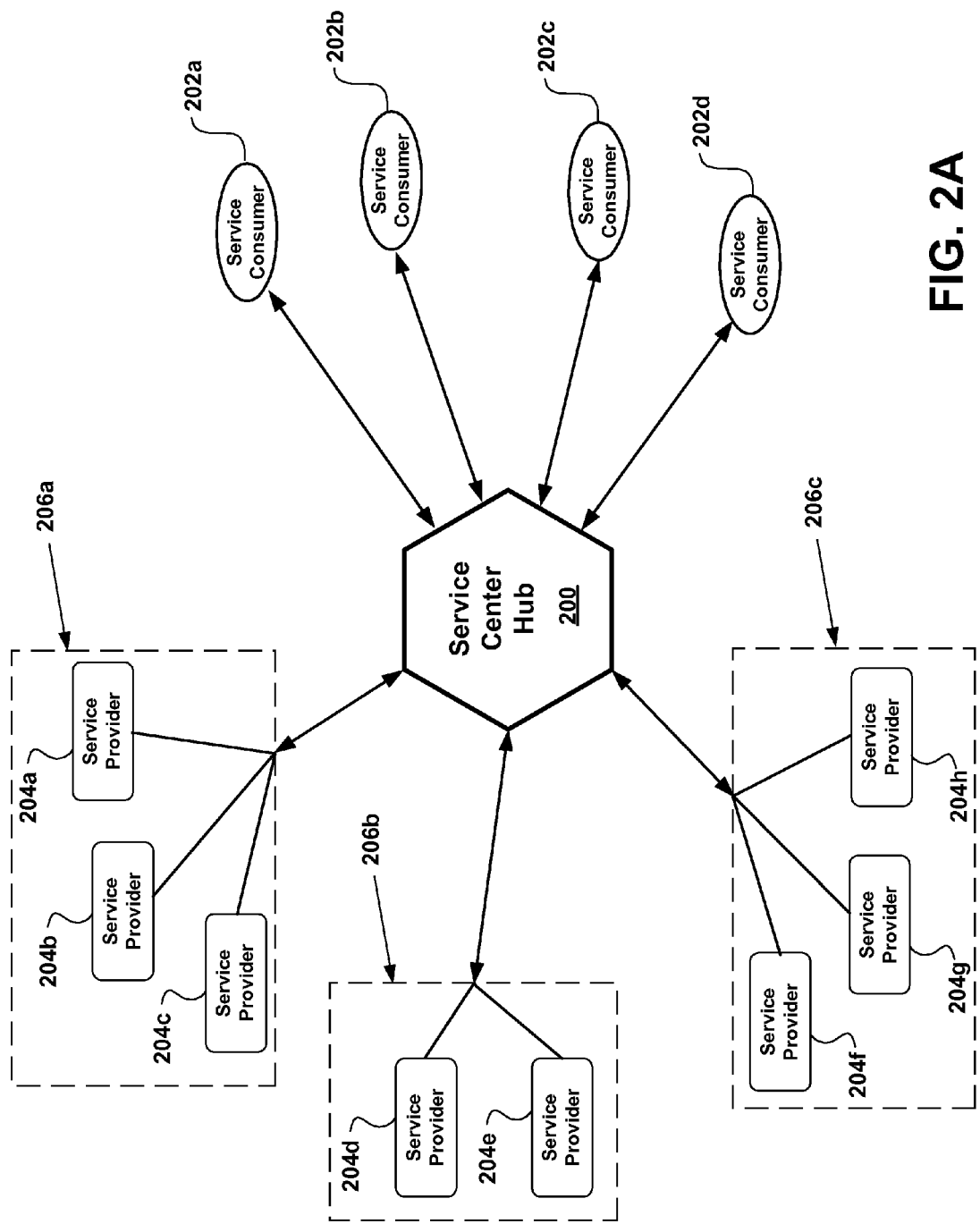
FIG. 2A is a diagram showing an exemplary system for interactively providing services through a central hub, in accordance with an embodiment of the present invention.

FIG. 1 was described in terms of the prior art. FIG. 2A is a diagram showing an exemplary system for interactively providing services through a central hub, in accordance with an embodiment of the present invention. Broadly speaking, embodiments of the present invention utilize a service center hub 200 to provide interactive communication between a plurality of service consumers 202a-202d and a plurality of service providers 204a-204h with some embodiments also providing for the provision of interactive communication between a plurality of service providers 204a-204h in the absence of service consumers 202a-202d. As will be described in greater detail below, service providers 204a-204h can be professional service providers, such as doctors, lawyers, accountants, financial analysts, and psychologists, or non-professional service providers, such as life coaches, spiritual advisers, automated mail-order bride/groom service providers, bartering service providers, and other professional and non-professional service providers as will be apparent to those skilled in the art after a careful reading of the present disclosure. Similarly, service consumers can be any type of customers of the services offered by the service providers, such as patients, clients, and other consumers as will be apparent to those skilled in the art after a careful reading of the present disclosure. Although FIG. 2A illustrates a finite set of service consumers 202a-202d and service providers 204a-204h, it should be noted that any number of service consumers and service providers can utilize the embodiments of the present invention.

In one or more embodiments, the service center hub 200 incorporates a website that is accessible via the Internet. In one or more embodiments, services can be provided remotely anytime and anywhere. Unlike conventional single discipline and service specific websites, embodiments of the present invention provide access to service providers in a plurality of disciplines, and allow service consumers to search for the services and service providers that they desire. For example, in FIG. 2A the service providers 204a-204h have been divided into three separate disciplines 206a-206c. In particular, service providers 204a-204c are grouped into a first discipline 206a, service providers 204d-204e are grouped into a second discipline 206b, and service providers 204f-204h are grouped into a third discipline 206c. To further exemplify the invention, the first discipline 206a could be law, the second discipline 206b could be counseling, and the third discipline 206c could be medicine. However, as above, it should be noted that the discipline divisions shown in FIG. 2A are for exemplary purposes and the embodiments of the present invention can be utilized with any number of disciplines in any number of fields.

In operation, embodiments of the present invention allow service consumers 202a-202d to locate and select a particular service provider 204a-204h, and thereafter to receive (a) service(s) from the selected service provider via the service center hub 200. The service center hub 200 of the embodiments of the present invention provides for locating, selecting, managing, scheduling, providing communications for or pertaining to, and conveying and collecting payments in any way related to the interactive provision of services. The service center hub 200, thus, provides an interactive base from which service consumers 202a-202d can search for services and/or service providers and receive services from one or more of the plurality of service providers 204a-204h. In this manner, service consumers 202a-202d can utilize the service center hub 200 to locate offerings, examine offerings, solicit and/or purchase offerings related to the service providers 204a-204h in a plurality of disciplines 206a-206c.

Service consumer and/or service provider interaction via a given embodiment of the present invention can be real-time and/or non-real time depending on the needs of the service consumer and/or service provider, and the communication methods offered. Exemplary interactive communication methods include audio-video conferencing, video conferencing, audio conferencing, instant messaging, e-mail, message board, phone, facsimile, and other modes of communication that will be apparent to those skilled in the art after a careful review of the present disclosure.

In addition, the service center hub 200 allows service providers 204a-204h in a plurality of disciplines 206a-206c to provide services to the service consumers 202a-202d via interactive communication as described above. The service providers 204a-204h can, for example, include professional service providers potentially verified for licenses and good standing. In one or more embodiments, the service center hub 200 provides anti-piracy and security when required by law, deemed appropriate, or deemed desirable. The service center hub 200 can further include advertisements and/or sponsorship information.

Figure 2B:
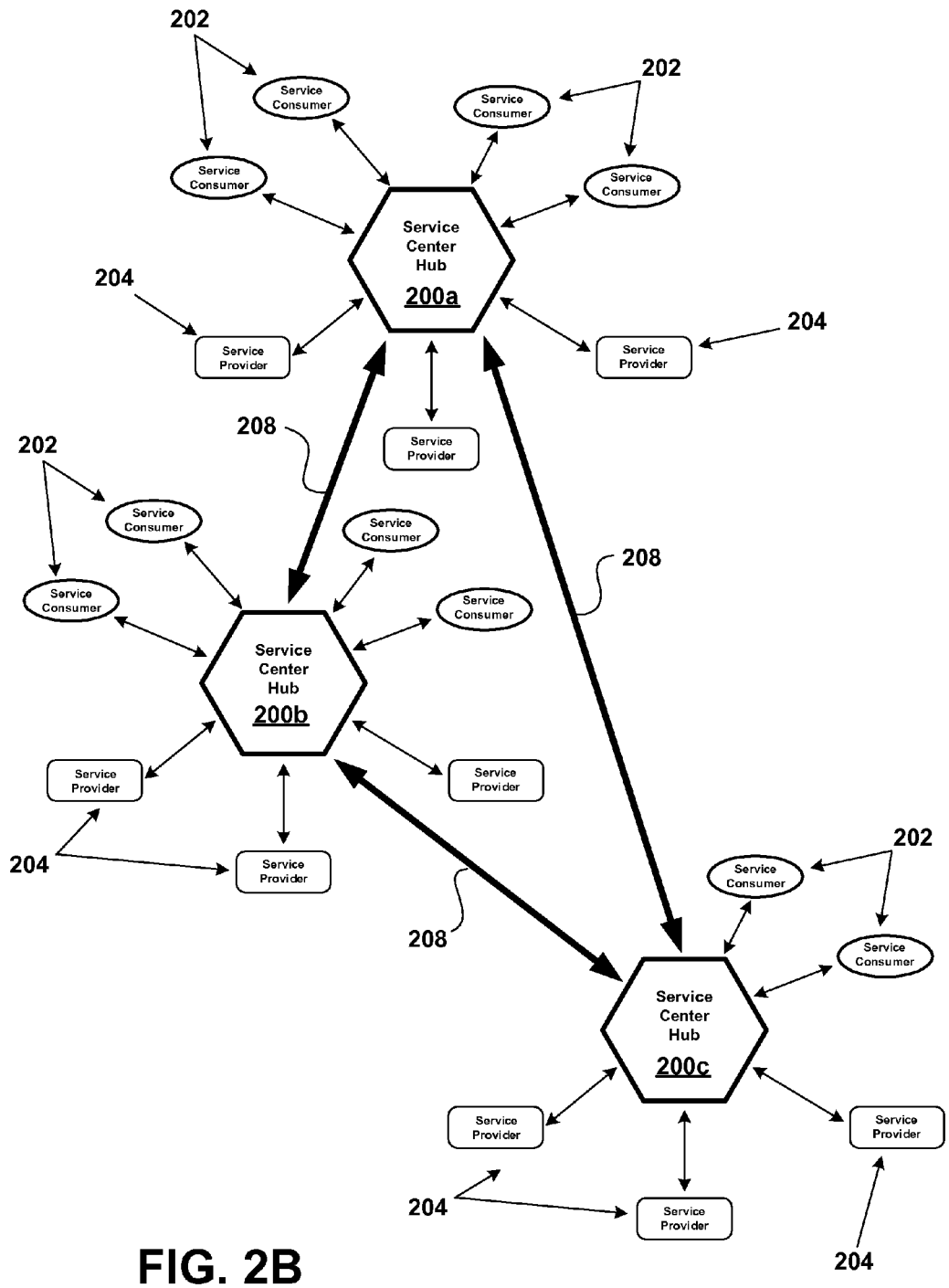
FIG. 2B is a diagram showing an exemplary system for interactively providing services through a central hub using a network based server configuration, in accordance with an embodiment of the present invention.

FIG. 2B is a diagram showing an exemplary system for interactively providing services through a central hub using a network based server configuration, in accordance with an embodiment of the present invention. The network based server configuration includes a plurality of service center hubs 200a-200c, each in communication with a plurality of service consumers 202 and service providers 204. The service center hubs 200a-200c further are in communication with each other via communication network links 208. The communication network links 208 can be any means for facilitating electronic communication between the service center hubs 200a-200c, such as private networks and virtual private networks. The decentralized manner in which the service center hubs 200a-200c of FIG. 2B operate can facilitate organizational aspects for services. For example, the networked service center hubs 200a-200c can facilitate customization and compartmentalization of individual service provider offerings, and/or geographic coverage, and/or facilitate disciplinary customization and segmentation. As mentioned above, service consumers 202 access the service center hub of some embodiments of the present invention using the Internet, as illustrated next with reference to FIGS. 3A and 3B.

Figure 3A:
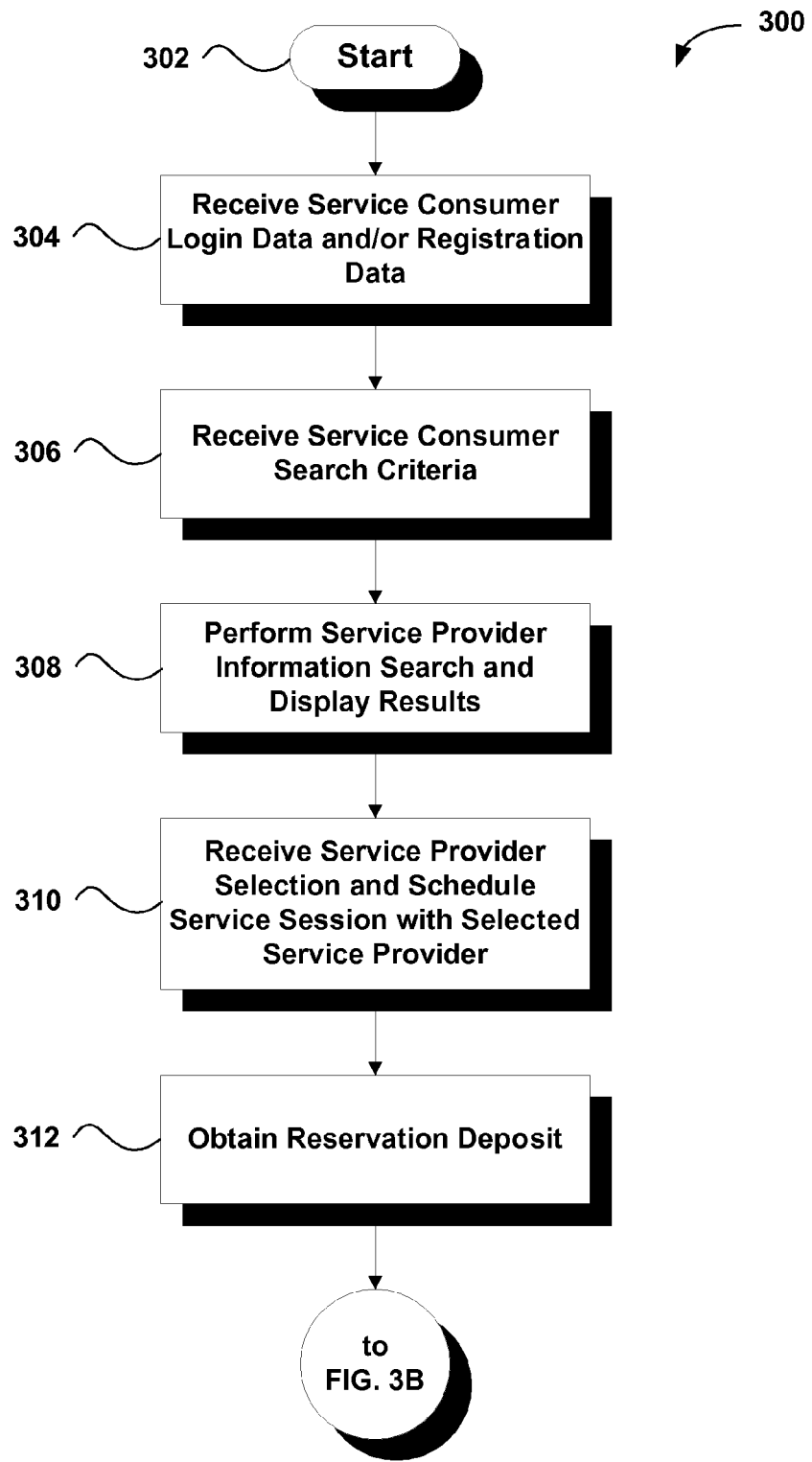
FIG. 3A is a flowchart showing an exemplary method for interactively providing services through a central hub, in accordance with an embodiment of the present invention.
Figure 3B:
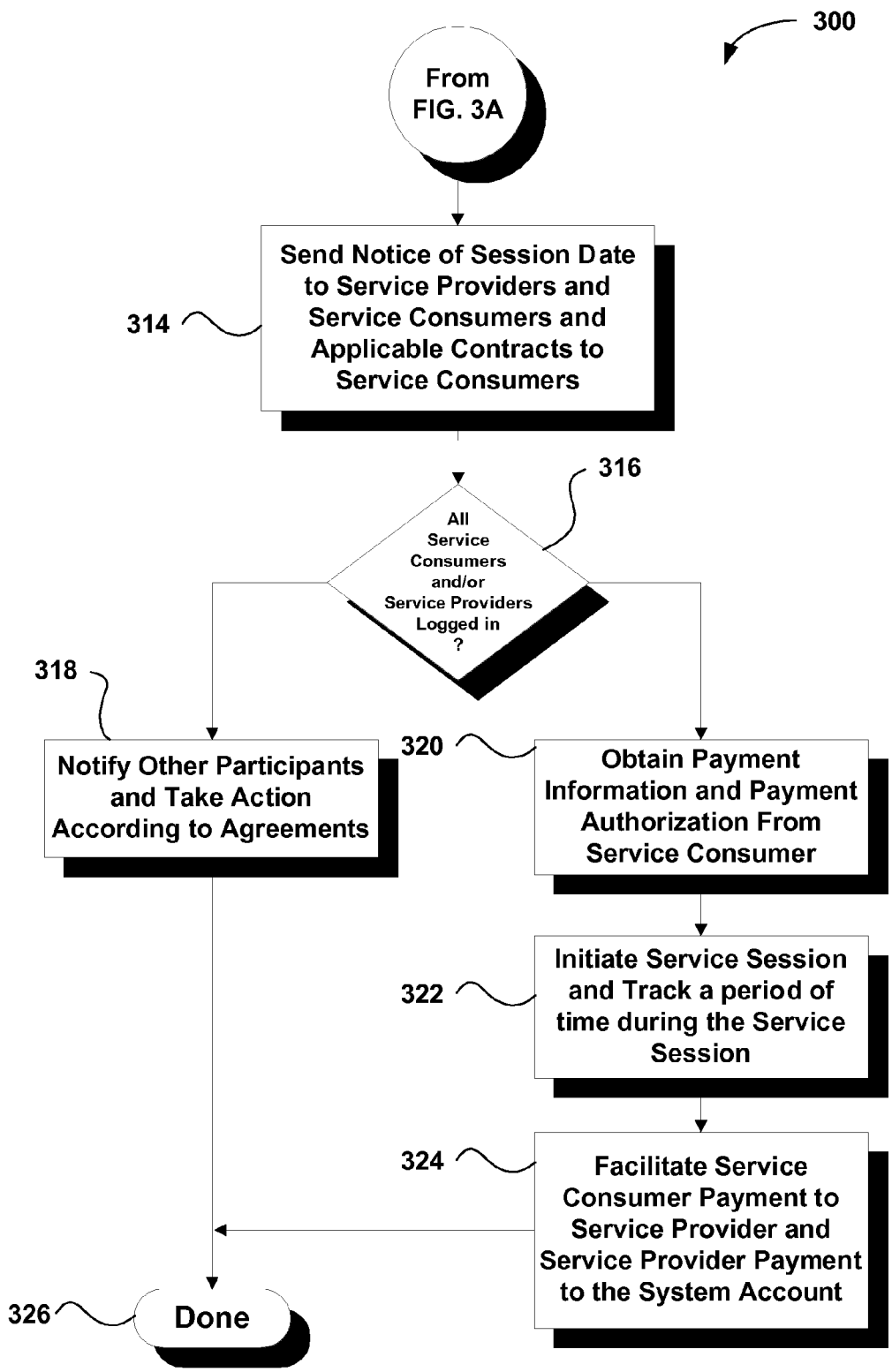
FIG. 3B is a continuation of the flowchart of FIG. 3A.

FIG. 3A is a flowchart showing an exemplary method for interactively providing services through a central hub, in accordance with an embodiment of the present invention. In an initial operation 302, preprocess operations are performed. Preprocess operations can include, for example, generating search category and subcategory data based on available services, pre-qualifying service providers for license status and standing, and other preprocess operations that will be apparent to those skilled in the art after a careful reading of the present disclosure.

In operation 304, service consumer login data and/or registration data is received. When a service consumer utilizes the service center hub of some embodiments of the present invention, the user enters the user's login data. If the service consumer is not yet registered with the service center hub, the user is allowed to register with the service center hub and is given login data for later use in logging into the service center hub. In one embodiment, registration and login can be skipped temporarily to allow the service consumer 202 to search for, whether by search engine, filtering, or other search means known to those skilled in the art, desired services or service providers prior to registration/login. In this case, if the service consumer chooses to schedule or request and secure the scheduling of a service session with a service provider, as discussed subsequently, the user will be prompted to register and/or login prior to scheduling or requesting the scheduling of a service session, as noted below.

Figure 4:
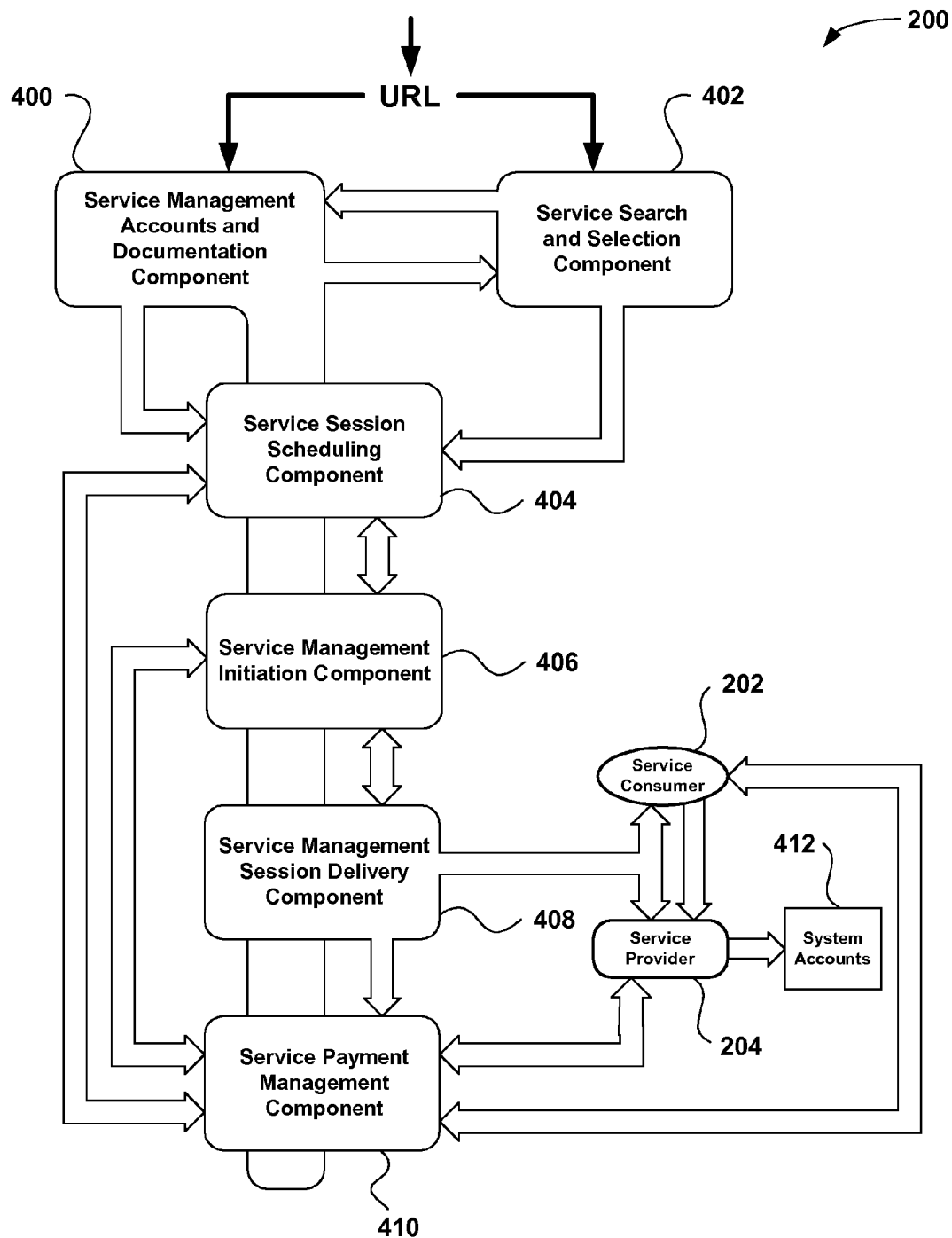
FIG. 4 is a diagram showing an exemplary service center hub implemented as a computer program operating on server hardware and accessed via the Internet, in accordance with an embodiment of the present invention.

FIG. 4 is a diagram showing an exemplary service center hub 200 implemented as a computer program operating on server hardware and accessed via the Internet, in accordance with an embodiment of the present invention. In one or more embodiments, the service center hub 200 includes a service management accounts and documentation component 400, a service search and selection component 402, a service session scheduling component 404, a service management initiation component 406, a service management session delivery component 408, and a service payment management component 410.

The exemplary embodiment of FIG. 4, is a computer program that generally executes on one or more Internet servers and is accessed by service consumers via service consumer computers executing Internet browsers. In general, each component of FIG. 4 includes a user interface, input/output (I/O) modules, database access modules, and data processing modules to perform the functionality set forth below.

In operation 304, the service management accounts and documentation component 400 receives service consumer login data and/or registration data. When registering, the service consumer is able to provide or receive information, acceptances, and preferences for the establishment and utilization of a service consumer account. Once registered, service consumers can utilize the service management accounts and documentation component 400 to login into the service center hub 200.

In one or more embodiments, hub-located advertisements and/or classified ads and/or sponsorship information optionally is/are displayed when the service consumer initially enters the service center hub via the Internet website. For example, the service center hub may include a list of links or classifieds, advertisements, sponsored information, search function/engines, and information concerning services offered for provision through interactive communication methods on and/or through the service center hub or elsewhere. In this manner, extra income can be generated by charging the owners of the advertisements, classified ads, and sponsorships for exposure on the service center hub. Upon accessing the service center hub, the service consumer is allowed to enter search criteria to search for desired services and service providers, as described next.

Turning back to FIG. 3A, service consumer search criteria are received in operation 306. Referring to FIG. 4, upon entering the service center hub, the service consumer 202 is allowed to search and elicit the display of services and/or service providers and/or information regarding service providers and/or service providers' information regarding services and/or other content and/or information using the service search and selection component 402. In one or more embodiments, (a) search engine(s) and/or links and/or (a) filter(s) and/or other search functions on the homepage and/or on another/other page(s) of the Internet website through which the service center hub 200 is accessible are used, as applicable, as (a) means of locating, eliciting the display of, one or more categories and/or sub-categories and/or specifications and/or exact identifications of information regarding services and/or service providers, and other service center hub 200 related functions.

Referring back to FIG. 3A, when a service provider information search is performed, results are displayed, in operation 308. Based on the service consumer search criteria, the service center hub searches for service and/or service provider information utilizing the service search and selection component 402 of the service center hub, as described next with respect to FIG. 4.

The service search and selection component 402 provides a means for locating, displaying, and selecting categories and/or sub-categories and/or specifications and/or near specifications and/or exact identifications of information regarding services and/or service providers, and/or other hub related functions. The service search and selection component 402 also provides a means of locating, displaying, and selecting for service provision inquiries, solicitations, purchases, services, and service providers. Notably, the service search and selection component 402 allows the service consumer 202 to access more detailed information regarding a selected service or service provider.

Referring back to FIG. 3A, a service provider selection is received and a session with the selected service provider is scheduled in operation 310. Once service provider information search results are displayed, the service consumer 202 is allowed to select information regarding a desired service provider and/or to select a service provider to be scheduled for a service session with the service consumer 202. Turning to FIG. 4, the service consumer 202 selects a service or service provider, generally using the service search and selection component 402. As discussed above, once the service consumer 202 selects a service provider 204 for the scheduling of a service session therewith, the service consumer 202 is, if not yet registered and/or logged in to the service center hub 200, prompted to register and/or login using the service management accounts and documentation component 400 as discussed in operation 304.

Once the service consumer 202 has made a selection, the service consumer 202 can utilize the service session scheduling component 404 to schedule or request and receive the scheduling of a service session with the selected service provider 204. A service session is a scheduled interaction between (a) service provider(s) 204 and (a) service consumer(s) 202, a scheduled interaction between two or more service providers 204, or another service-related interaction and/or provision on behalf of one or more service consumers. A service session can be scheduled for immediate interaction, or for future interaction. As described above, the interaction between the service provider 204 and the service consumer 202 can be in real-time, such as audio-video conferencing, or non-real-time, such as, via e-mail.

To schedule or request the scheduling of a service session, the service consumer 202 selects and submits (an) offered date(s) and time(s), and/or specifies and submits (a) date(s) and (a) time(s) that are not expressly offered by the service session scheduling component 404. In addition, the service consumer may be required to accept particular service provider contracts when prompted by the service session scheduling component 404. In one or more embodiments, a service session can be scheduled for a set duration. In some of such embodiments, the service consumer 202 can make an offer, utilizing the service session scheduling component 404, to the service provider 204 to extend a service session of set duration. The service provider 204 can then either accept or decline the offer and extend or not extend the service session accordingly. Although generally a service session cannot be extended once completed, the service consumer 202 can schedule or request and secure the scheduling of a new service session utilizing the service session scheduling component 404, as described above.

In one or more embodiments, the service session and scheduling component 404 allows the service consumer 202 to specify a preferred date and time for the service session. In one or more of such embodiments, the service consumer 202 also specifies a back-up date and time for the service session. While the preferred date and time need not be selected from dates and times that are offered by the service session and scheduling component 404, the back-up date and time is selected from dates and times offered, as for example, via a list of possible dates and times for the service session. The service session and scheduling component 404 then sends a request for acceptance of the preferred date and time to the service provider 204. The service provider 204 then accepts or declines the preferred date and time or abstains from responding to the request for a certain duration. The service session and scheduling component 404 then schedules the service session for the accepted preferred date and time or the back-up date and time in the event that the preferred date and time is not timely accepted by the service provider.

Although scheduling has been thus far discussed in terms of interactions between a single service consumer 202 and service provider 204, it should be noted that a service session may include a plurality of service consumers 202 and service providers 204. Similarly, a service consumer 202 can schedule multiple service sessions with one or more service providers 204. Under one or more embodiments of the present invention, two or more service providers can, on behalf of and at the expense of one or more service consumers, participate in a service session without any participating service consumers.

Under one or more embodiments of the present invention, when scheduling or requesting the scheduling of a service session, the service consumer 202 can choose a communication method for the service session from a plurality of communication method options offered by the selected service provider 204 or offered in common by the selected service providers 204 as established by the service provider's communication preferences.

Under one or more embodiments, during the scheduling process for a non-immediate service session, the service consumer 202 can schedule or request and secure the scheduling of a pre-consultation to discuss preliminarily background information, basic circumstances, and other information with the service provider 204. In general, the pre-consultation session is part of the service session and constitutes a temporal increment carved out of or added to the service session. Where no pre-consultation is scheduled or requested, despite being offered, or where an immediate service session is being scheduled, the information to be conveyed in the pre-consultation can be conveyed during the service session.

Under one or more embodiments of the present invention, a reservation deposit is obtained during the scheduling process in operation 312 of FIG. 3A. Referring to FIG. 4, the service session scheduling component 404 provides pertinent session scheduling information to the service payment management component 410, which, when applicable, sends a reservation deposit payment information and an authorization request to the service consumer 202. Once the service consumer 202 submits the requested payment information and authorization to the service payment management component 410, the service payment management component 410 facilitates pre-authorization and/or collection of payment from the service consumer 202 for a reservation deposit. A reservation deposit generally is pre-authorized and/or otherwise set aside and/or collected for each service provider 204 scheduled for the session. Reservation deposits may or may not be collected if an immediate service session is scheduled.

Referring back to FIG. 3B, once the service session is scheduled, and any and all applicable reservation deposits are pre-authorized and/or otherwise set aside and/or collected, a notice of the service session date and time is conveyed to all parties participating in the service session, and any applicable contracts are sent to any service consumer scheduled to participate in the service session, where such service consumer has not accepted any such applicable contracts, in operation 314.

Service sessions comprising work scheduled to be performed by, research by, or online or offline meetings between service providers on behalf of (a) service consumer(s) are offered via the service session and scheduling component 404 as scheduling or scheduling request possibilities. Any such service session is scheduled or requested for scheduling like any other service session except that it may be treated as a service session of set duration with no communication method at the request of the scheduling service consumer, where, for example a service provider is merely conducting research or preparing work without the need for a communication method.

Prior to a service session, one or more reminders may be sent, for example, via email, to the parties scheduled for the service session. In addition, at some point prior to commencement of the service session, the service management initiation component 406 retrieves and conveys any applicable contracts to any service consumer 202 scheduled for participation in the service session, in the event that any applicable contracts have not been accepted by that service consumer.

At the date and time of the scheduled service session, the service management initiation component 406 determines whether all service consumers and/or service providers scheduled for the service session are logged in and ready to begin the session, in operation 316. If all scheduled service consumers and/or service providers, as applicable, are logged in at the date and time of the service session, the method 300 continues to operation 320. Otherwise, the method 300 branches to operation 318.

If any participant to the service session is not logged in, the service management initiation component 406 notifies all other service consumers and/or service providers scheduled for the service session in operation 318. In addition, upon such notification, logged in service consumers scheduled to participate are given a plurality of permitted options to perform. Exemplary options can include delaying participation in the service session or beginning participation in the service session, obtaining scheduling of additional or alternative service providers for the service session, and rescheduling the service session for an alternative date and time.

If all participants to the service session are logged in or an election is made 318 to commence the service session without one or more scheduled participants, the service management initiation component 406 informs the service payment management component 410 and the service payment management component 410 sends a payment information specification and payment authorization request to and obtains payment authorization from each, logged in participating service consumer 202, responsible for the payment of one or more scheduled service providers. Optionally, in the event that (a) service consumer(s) responsible for the payment of (a) service provider(s) is/are not logged in at the time at which a payment information specification and payment authorization request is to be submitted thereto, any of the other logged in service consumers scheduled to participate in the service session may accept payment responsibility for one or more service providers in place of the service consumer(s) not then logged in. Accordingly, where a service consumer responsible for payment of at least one service provider is not logged in at the date and time of the service session, a payment information specification and payment authorization request is sent to each logged in service consumer for the potential election of payment responsibility by one or more of such service consumers. Once the required payment information specification and payment authorization request(s) is/are received, the method 300 continues to operation 322.

In operation 322, the service session is initiated and a period of time of the service session is tracked, via the tracking of the service session and/or the participation time of one or more service session participants in the service session. Referring to FIG. 4, the service payment management component 410 signals the service management initiation component 406 that payment information and payment authorization have been received. The service management initiation component 406 then signals the service management session delivery component 408 to initiate the service session with the appropriate service provider and/or service consumer participants, with the parameters set during scheduling.

The service management session delivery component 408 undertakes the provisioning of, by effectuating or facilitating the effectuation of, interactive communications between service consumers 202 and service providers 204 using for example, audio-video conferencing, Blackboard, online telephone, video conferencing, audio conferencing, instant messaging, message board, e-mail, phone, facsimile, and other modes of communication that will be apparent to those skilled in the art after a careful review of the present disclosure. Under some embodiments of the present invention, one or more communication applications may be utilized by the service management session delivery component 408 in provisioning interactive communications. Under some such embodiments, the service management session delivery component 408 may automatically initialize and/or connect any communication application utilized. If desired, the communications with or without security and anti-piracy features may be immediately secured. Under one or more embodiments, the service management session delivery component 408 may also facilitate the exchange between parties to a service session of documents stored by the service management accounts and documentation component 400 in the service management database 504. Additionally, in one or more embodiments, the service management session delivery component 408 may provide for the utilization by service consumers and/or service providers of note taking, spreadsheet, presentation, and/or other service session memorialization and/or summarization functions during service sessions.

In addition to establishing the service session, under one or more embodiments of the invention, the service management session delivery component 408 can track a period of time during the service session, monitoring time and/or time-related data and/or making time adjustments and/or producing time duration calculations, for tracking or billing purposes. Under one or more embodiments of the invention, once a paying service consumer's participation in the service session terminates, payment from the service consumer is facilitated as discussed next with reference to FIG. 3B.

In operation 324, service consumer payment to the service provider and service provider license and/or client fee payment to a system account, an account in which payments from service providers are received, are facilitated in one or two transactions. As exemplified by FIG. 4, under one or more embodiments of the invention, when the participation in the service session of each service consumer responsible for payment terminates, the service management session delivery component 408 stores time tracking data in the service management database 504 and notifies the service payment management component 410 that the service consumer's service session participation has been terminated. Under one or more embodiments of the invention, the service payment management component 410 retrieves said time tracking data from the service management database 504 and uses the time tracking data to facilitate, by transacting or providing for the transacting of a service consumer payment to the service provider. In addition, the service payment management component 410 facilitates, by transacting or providing for the transacting of, a service provider licensee and/or client fee payment to a system account 412 of the service center hub 200. The service provider licensee and/or client fee is a fee charged by the service center hub to the service provider for use of the service center hub. These transactions can be online transactions via one or more designated payment conveyance and/or receipt means, such as for example, credit cards, service center hub units of credit, service center hub user accounts, automatic debits, online escrow, Pay Pal, Bill Me Later, e-Check, online account transfers, Automated Clearing House (ACH) transactions, Google Checkout, and other payment methods that will be apparent to those skilled in the art after a careful review of the present disclosure. Any costs and/or expenses incurred by the service provider on behalf of the service consumer may be a required component of the payment to the service provider. Any costs and/or expenses incurred by the service center hub on behalf of the service provider may be a required component of the payment to a system account 412. In addition, the service payment management component 410 can prepare or facilitate preparation of appropriate billing materials for service consumers and service providers.

Post-process operations are performed in operation 326. Post-process operations may include, for example, review of service provider's service hub account, review of service consumer's service hub account, and other post-process operations that will be apparent to those skilled in the art. At any time, a logged-in service provider can review information regarding the management of the service provider's services and service provider account. Service providers can also submit for storage and manipulate documents and reports. In addition, service consumers can submit for storage, retrieve, and manipulate documents and reports.

Figure 5:
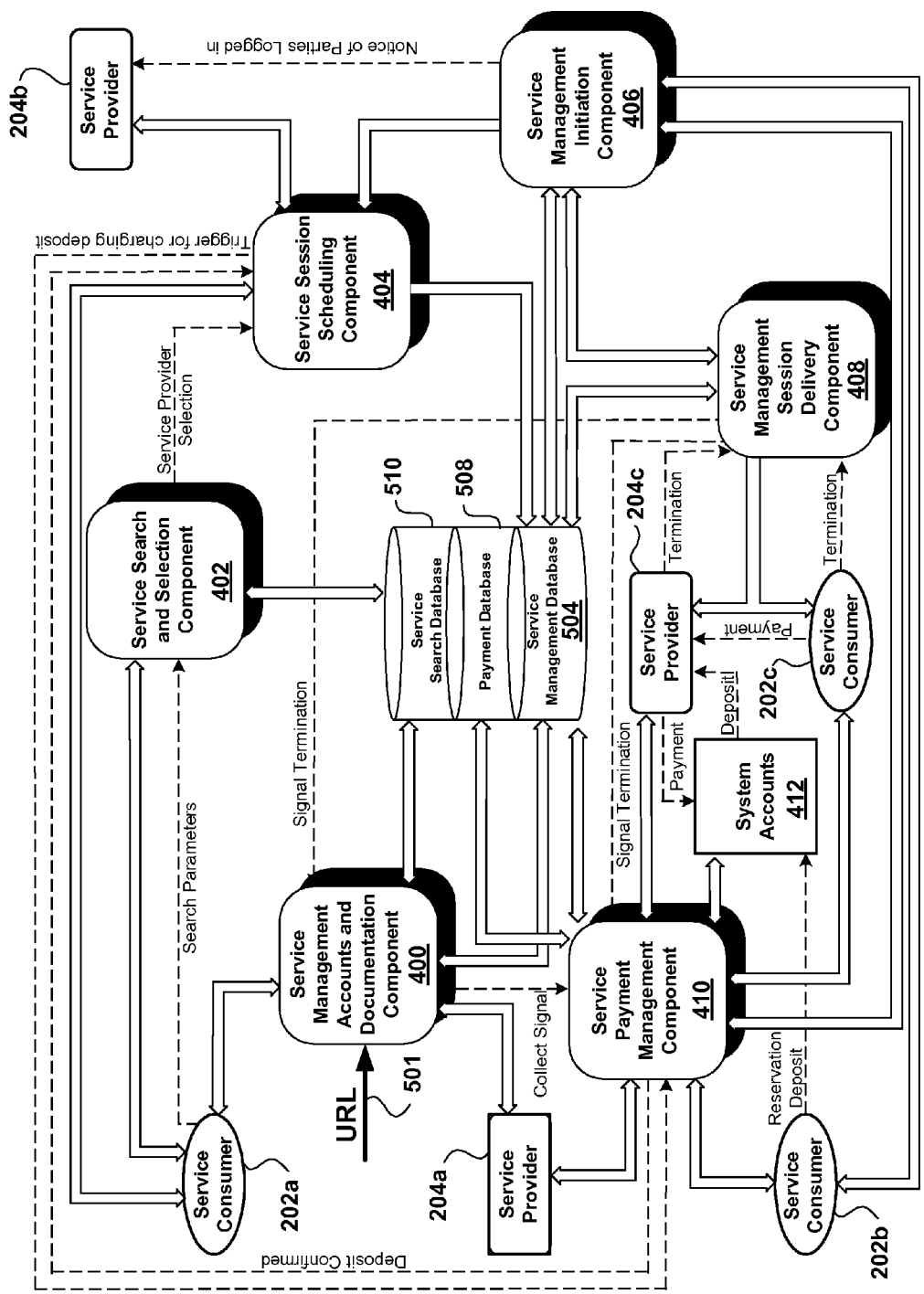
FIG. 5 is a data flow diagram showing a service center hub, in accordance with an embodiment of the present invention.

FIG. 5 is a data flow diagram showing a service center hub 200, in accordance with an embodiment of the present invention. In particular, FIG. 5 shows the flow of data from external entities into the service center hub 200, and how the data moves from one process to another, as well as its logical storage. The service center hub 200 generally serves service providers and service consumers. Three service consumers 202a-202c and three service providers 204a-204c are illustrated in FIG. 5 to show that the service center hub 200 may have multiple users signed on at any one time and each is served based upon a unique login ID and/or e-mail address and/or some other identification means elected or ascribed, during the registration process under one or more embodiments.

As discussed above, the service center hub 200 of the exemplary embodiments includes a service management accounts and documentation component 400, a service search and selection component 402, a service session scheduling component 404, a service management initiation component 406, a service management session delivery component 408, and a service payment management component 410. Each of these components represents systematic processes and/or systematic programmatic means and/or systematic processing means, which take the data as input, process the input data, and output it. The arrows represent data flows or procedures/methods in electronic form, but can also in some circumstances, be non-online-based items or processes (e.g., a letter or a facsimile transmission). Thin arrows represent the flow of specific data items whereas thick arrows represent general and/or multiple sets of data and/or document flows.

In addition, among other embodiments, the exemplary embodiments of the service center hub 200 includes a service search database 510, a payment database 508, and a service management database 504. The databases provide for the holding and manipulation of data using, for example, a standard Relational Database format, such as SQL, or other data storage technology. Some portions of the data may be held in a variety of data and/or document formats, such as XML or PDF with a data dictionary or repository of descriptions of data types or object types, to allow for easy manipulation and delivery depending upon various possible uses. In the embodiment of FIG. 5, access to the service center hub 200 is obtained via a website utilizing a user's computer and Internet browser software. The user first obtains access to the website's main page via an Internet uniform resource locator (URL) 501.

In a first example of use in FIG. 5, a potential service provider 204a wanting to offer services to others begins with the application and registration process. The potential service provider 204a applies as an applicant to become a client and/or licensee of the service center hub 200 in order to offer services through the service center hub 200. When the potential service provider 204a places an application inquiry (e.g., by clicking on a hyperlink button), the service management accounts and documentation component 400 transmits to the potential service provider 204a an electronic application for completion (with information, potentially, but not necessarily including, but not restricted to, the applicant's name, contact information, educational background, credentials, information regarding intended service(s) and/or category/categories of service, licenses, disciplinary standing, experience, affiliations, criminal background if any, civil background, scheduling information, etc.) and/or a contractual authorization request requesting authorization to investigate the potential service provider 204a (e.g., via license and professional standing verification and/or through a background check performed by a third party background check service).

The potential service provider submits the application and/or contractual authorization to the service management accounts and documentation component 400 and the service management accounts and documentation component 400 sends or otherwise conveys the application and/or contractual authorization to the service management database 504 for storage. The service management database 504 may categorize service provider and/or service provider applicant data by discipline (e.g., lawyer, psychologist, paralegal, career/college counselor, life coach/counselor, financial analyst, computer consultant, chaplain/priest/rabbi/spiritual adviser, appraiser, travel agent, private investigator, healthcare consultant, market research consultant, accountant, nutritionist, etc.) and/or by any other primary category and/or sub-category.

In one or more embodiments, during the application process, a service provider 204 applicant of the service center hub 200 may be required to submit to a background check conducted by a third party background check service. In one or more of such embodiments, the service management accounts and documentation component 400 signals the service payment management component 410 to prompt the potential service provider 204a to authorize payment, provide payment information to the service payment management component 410, and to make a payment facilitated through the service payment management component 410 via one or more payment methods to a third party background check service for the cost of a background check and/or to a system account 412 of the service center hub for the cost of processing the potential service provider's 204a application. Exemplary payment methods can include, for example, credit cards, service center hub units of credit, service center hub user accounts, automatic debits, online escrow, Pay Pal, Bill Me Later, e-Check, online account transfers, Automated Clearing House (ACH) transactions, Google Checkout, and other payment methods that will be apparent to those skilled in the art after a careful review of the present disclosure. The service payment management component 410 may transmit the payment information submitted by the potential service provider 204a to the payment database 508 for storage.

In one or more other embodiments, if a background check is required, the service management accounts and documentation component 400 directs the potential service provider 204a to a third party background check service website to procure a background check and the direct submission (by the third party background check service) of the results therefrom to the service management accounts and documentation component 400.

A potential service provider's 204a application (along with any background check results) is examined and accepted, declined, or designated as requiring additional information. A notice of the disposition of the application is displayed following the potential service provider's 204a application submission and/or conveyed subsequently on an electronic basis to the potential service provider 204a via the service management accounts and documentation component 400. In the case of acceptance, the notice can include a system-ascribed login ID and/or password that is stored in the service management database 504, and any login ID and/or password and/or email address specified in the service provider application, if applicable. When additional information is required, the notice can notify a potential service provider 204a of what additional information is required.

Service provider applicants receiving notice that additional information is required, may submit such information to the service management accounts and documentation component 400 or to the third party background check service (as applicable). If the potential service provider's 204a application is accepted, a service center hub provider account, potentially including a service center hub e-mail account, may be created for the accepted service provider, here service provider 204a, using information from the service provider's 204a application.

The service provider 204a utilizes the ascribed login ID and/or password and any login ID and/or password selected in said service provider's 204a application and/or provides answers to personal questions previously answered in the service provider's 204a application and/or uses the service provider's 204a e-mail address (as specified in the service provider's 204a application) and an ascribed password, initially to login to the service provider's 204a service center hub service provider account, via the service management accounts and documentation component 400.

Under one or more embodiments, upon initial login, the service provider's 204a service center hub service provider account is inactive, and service provider 204a may be required immediately to register through service management accounts and documentation component 400 or the service provider 204a may be permitted to register later. In one or more embodiments, the service provider 204a registers to activate the service provider's 204a service center hub service provider account and render official that service provider's 204a status as a service provider client and/or licensee. During registration, service management accounts and documentation component 400 provides the service provider 204a with a terms of use contract that is executed by e-signature or actual signature and submitted to service management accounts and documentation component 400, which conveys the contract to the service management database 504 for storage.

During registration, the service management accounts and documentation component 400 also signals the service payment management component 410 to prompt the service provider 204a with instructions regarding options and requirements for payment collection and conveyance, with a request for an election by the service provider 204a of (a) designated payment receipt means and (a) designated payment conveyance means, with a request for any payment information necessary to facilitate payment to and the collection of payment from the service provider 204a via the elected payment means, and potentially with a request for service provider's 204a billing rates and/or billing terms. The service provider 204a submits the requested payment and/or billing information to the service payment management component 410, which sends the information to the payment database 508 for storage.

Also during the registration process, the service management accounts and documentation component 400 can request that the service provider 204a submit to the service management accounts and documentation component 400 such data as the service provider's 204a initial scheduling availability for service sessions (days and/or dates, and times), initial communication preferences for service sessions, billing rates, billing terms, and an engagement agreement, or information to be utilized in customizing a form engagement agreement to be furnished by the service center hub for usage by the service provider 204a when contracting with a service consumer 202a to provide service to the service consumer 202a via the service center hub 200.

Upon completion of the registration process, the service management accounts and documentation component 400 creates a service provider profile for the service provider 204a using the information from the service provider's 204a application stored in the service management database 504. The service management accounts and documentation component 400 sends the service provider 204a profile to the service search database 510 for storage so that the profile subsequently can be retrieved by searching, whether by search engine, filtering, or other search means known to those skilled in the art. In one or more embodiments, the service search database 510 categorizes service provider data, for example, by discipline, other categories and/or sub-categories.

In one or more embodiments, service provider search profiles are the primary documents retrieved by the service search and selection component 402 during service consumer searches. Each profile includes a breakdown of information regarding a service provider. After registration, service providers can modify their service provider profiles as deemed necessary. Thus, the service center hub databases provide for the storage, management, modification, and retrieval of service provider data. For example, the service management database includes data and documents useful to facilitate the management and display of service provider accounts and documentation. Items such as contracts, applications, registration information, documents used in or pertaining to services, pictures, and other documentation in multiple media formats can be stored in and/or retrieved from the service management database through use of the service management accounts and documentation component 400 or via internal system extraction methods. The service search database 510 includes information accessible to and retrievable by all users. In addition to storing service provider profiles, the service search database 510 can also store information for retrieval by search, whether by search engine, filtering, search/filtering refinement, links, or other search means known to those skilled in the art.

In addition to service providers, service consumers 202*a* can register via the service management accounts and documentation component 400 in a registration process requiring generally less registration information than the registration for service providers and requiring contractual terms of use acceptance. In the course of registration, a service consumer, for example service consumer 202*a* is provided with a system-ascribed login ID and/or password, which is/are stored in the service management database 504, to be used, if applicable, along with any login ID and/or password and/or email address specified by the service consumer 202*a* in that service consumer's 202*a* registration information submittal.

After registering, the service consumer 202*a* can login using said service consumer's 202*a* ascribed or elected login ID and/or e-mail address and/or ascribed or elected password. Upon registration, the service consumer 202*a* can be provided with a confirmation of registration and may create or be ascribed a service center hub user e-mail address.

Before and after logging in, service consumers are presented with and have access to the user interface of the service search and selection component 402. The service search and selection component 402 allows service consumers and service providers, and/or other Internet users to retrieve service provider listings and service provider profiles and/or information about services and/or other information. Through the service search and selection component 402, a service consumer 202*a* can search for search results, whether by search engine, filtering, links, refinement, or other search means known to those skilled in the art.

The service consumer's 202*a* search is facilitated by the service search and selection component 402. The service search and selection component 402 retrieves search results from the service search database. Accordingly, the service consumer 202*a* is able to view one or more services and/or service providers returned as output in response to the service consumer's 202*a* search parameters. The service search and selection component 402 may allow for the filtering of one or more services and/or service providers via the utilization of one or more categorical and/or otherwise criteria-based filters with one or more input stages.

As noted previously, the service consumer 202*a* is allowed to select a service provider 204*a* found during the search, and schedule and/or request and secure the scheduling of a service session with that service provider 204*a*. Under one or more embodiments, the service consumer 202*a* utilizes the service session scheduling component 404 to schedule a service session with the selected service provider 204*a*. To schedule the service session, the service consumer 202*a* selects and submits or specifies a date and time from those offered via the service session scheduling component 404. In addition, the service consumer 202*a* may be required to accept any applicable service provider contracts when prompted by the service session scheduling component 404.

In one or more embodiments, the service session and scheduling component 404 allows the service consumer 202 to specify a preferred date and time for the service session as well as a back-up date and time for the service session. While the preferred date and time need not be selected from dates and times that are offered by the service session and scheduling component 404, the back-up date and time is selected from dates and times offered, as for example, via a list of possible dates and times for the service session. Upon submission of a preferred date and time and a back-up date and time by a service consumer 202*a*, the service session and scheduling component 404 sends a request for acceptance of the preferred date and time to the service provider 204*a* selected by the service consumer for participation in a service session. The service provider 204 then accepts or declines the preferred date and time or fails to respond to the request before a certain duration of time elapses. The service session and scheduling component 404 then schedules the service session for the timely-accepted preferred date and time, or the back-up date and time in the event that the preferred date and time is not timely accepted by the service provider.

Under one or more embodiments of the invention, at the date and time of the scheduled session, if all participants to the service session are logged in or, if the logged-in service consumers 202 scheduled for the service session are given the option to and elect to commence the service session despite the absence of one or more scheduled parties, the service management initiation component 406 informs the service payment management component 410. Under one or more embodiments, one or more service consumers in a group of participating service consumers may accept responsibility to pay for or be required to pay for service provider participation in a service session. Accordingly, the service payment management component 410 sends a payment information specification and payment authorization request to, and obtains requested payment information and authorization from each participating service consumer 202*b* or each participating service consumer responsible for payment of at least one service provider 204*b*.

Under some embodiments, the service session is initiated when the service payment management component 410 signals the service management initiation component 406 that the applicable payment information specification and payment authorization request responses have been received. The service management initiation component 406 then signals the service management session delivery component 408 to initiate the service session with the appropriate service provider and service consumer participants, with the parameters set during scheduling.

The service management session delivery component 408 undertakes the provisioning of, by effectuating or facilitating the effectuation of, interactive communications between service consumer 202*c* and service provider 204*c* using, for example, audio-video conferencing, Blackboard, online telephone, video conferencing, audio conferencing, instant messaging, message boards, email, phone, facsimile, and other modes of communication that will be apparent to those skilled in the art after a careful review of the present disclosure. If desired, the communications can be immediately secured utilizing the security and anti-piracy features.

In addition to establishing and maintaining the service session, the service management session delivery component 408 can track a period of time during the service session, monitoring time and/or time-related data and/or making time adjustments and/or producing time duration calculations, for tracking or billing purposes. The facilitation and tracking functions of the service management session delivery component 408 monitor time and/or time-related data and/or produce time duration calculations and/or make time adjustments, on one or more of various bases, such as incremental, actual, and adjusted bases, to arrive at service session durations for tracking and/or billing purposes.

The service management session delivery component 408 may track the respective participation commencement and termination times of all service providers and/or all service consumers or all paying service consumers in a service session and calculate participation durations therefrom. Also, service management session delivery component 408 may track the initialization and deactivation or disconnection times of the communication applications utilized by each service provider 204c and service consumer 202c that participated in the service session and calculate the participation durations that transpired between initialization and deactivation or disconnection therefrom.

Where the service management session delivery component 408 calculates durations based on adjusted times, the service management session delivery component 408 may utilize recorded data in a formula along with standardized time adjustments, variables, and coefficients to calculate adjusted participation times. However, it should be noted that the service management session delivery component 408 can merely monitor the participation durations between sign-in to the communication applications and sign-out or disconnection, and calculate participation time attributable thereto. In addition, the service management session delivery component 408 may monitor the durations of any service session participation extensions by monitoring the activity of applicable communication applications from the onset of the extension period to the sign-out from or disconnection of the applicable communication application(s) utilized by the applicable service session participants.

The service management session delivery component 408 may track the times at which the service session communications of all service consumers and/or all service providers first and last met protocol communication quality levels and calculate applicable protocol participation times based thereon. The service management session delivery component 408 can also track the time duration(s) for which the service session communications of all service consumers or paying service consumers and/or all service providers participating in a service session met protocol communication quality levels. Protocol communication quality levels may include and subsume communication levels that are below otherwise acceptable quality levels due to issues beyond the service center hub's correction abilities and/or (a) cause(s) rendering them excluded under policy from sub-protocol communication level characterizations, such as, a lack of appropriate user hardware, insufficient Internet connection speed, and temporary server problems as excluded under policy. Service session participant information can be included in a service session detail document produced by the service management session delivery component 408 and conveyed to the service management database 504 for storage.

Under some embodiments of the invention, once the participation of a service consumer 202c responsible for the payment of at least one service provider 204c terminates, the service management session delivery component 408 signals the service payment management component 410 regarding the termination of the service consumer's participation in the service session. The service management session delivery component 408 also transmits to the service management database 504 for storage the service session participation duration(s) of the service provider(s) for whom/which each such service consumer has payment responsibility.

The service payment management component 410 extracts the applicable duration data from the service management database 504. Determining the proper payments in the case of each service consumer responsible for the payment of at least one service provider, the service payment management component 410 facilitates each service consumer's 202c payment to each service provider 204c for whom/which each service consumer has payment responsibility. In the case of each such service provider receiving payment from a service consumer for service session participation, the service payment management component 410 further facilitates a client and/or licensee payment from the service provider to a system account 412, an account in which payments from service providers are received, under some embodiments in a second transaction that is potentially simultaneous with or close in time to the first transaction. The service provider client and/or licensee payments can be determined on one or more bases as for example, based on a percentage of the service provider's billing rate multiplied by the service provider's service session participation time on behalf of the service consumer, with any fee scaling or formulaic adjustments, based on a flat fee per service provider service session participation increment, or based on a flat fee per one or more services. Under some embodiments of the invention, the service payment management component 410 also prepares or facilitates the preparation of the appropriate billing materials and conveys the billing data to the payment database 508 for storage and access via the service management accounts and documentation component 400 by each respective, applicable service consumer and/or service provider accessing the respective service center hub user account therefor. The service payment management component 410 may also conveys receipts, notices, and/or information to the service management database 504 for storage and access via the service management accounts and documentation component 400 by each respective, applicable service consumer and/or service provider accessing the respective service center hub user account therefor.

The service payment management component 410 also may produce billing material for payment collection and/or record keeping through non-electronic means. In one or more embodiments, the service payment management component 410 utilizes (a) fee scaling and/or adjustment formula (s) in determining licensee and/or client payments to be paid by service providers. In some such embodiments, the formulas provide for scaling and/or adjustments that reflect the monetization of acts and/or omissions on the part of service providers (e.g., acceptance of preferred dates and times and/or the aggregate and/or periodic attainment of a particular number of service provider participation hours and/or an aggregate payment history of having paid licensee and/or client payments totaling a certain amount and/or the periodic payment of licensee and/or client payments totaling a certain amount, etc.) in order to normalize licensee and/or client payments.

In one or more embodiments, the service management session delivery component 408 also signals the service management accounts and documentation component 400 upon the termination of the service session. When the service management accounts and documentation component 400 receives this signal, the service management accounts and documentation component 400 transmits a request for the service consumer 202c either to confer or abstain from conferring a priority bonus upon each of the service session service providers that participated in the applicable service session or upon each, if any, of the service providers who participated in the service session and for whom the service consumer has payment responsibility. Each priority bonus is essentially an undifferentiated unit of benefit conferred by a service consumer upon a service provider in appreciation of said service provider's service or conferred upon the service provider by the service center hub 200 to promote certain acts or omissions by the service provider (e.g., priority bonuses may, inter alia, be used by the service center hub to encourage service provider acceptance of preferred dates and times). Each priority bonus conferral submitted may be factored into (a) formula (s) for the prioritization and/or display of service providers in search results and contributes to the obtainment of a threshold at which a service provider receives a higher placement in the listing (or other display) of said results and/or a more prominent display therein.

Thus, under some embodiments of the invention, when a priority bonus conferral submission is made for a service provider, the service management accounts and documentation component 400 conveys the priority bonus submission data to the service management database 504 for storage and retrieves all relevant priority bonus data stored for a service provider in service management database 504 for the relevant service provider. Upon retrieving the relevant priority bonus data stored in service management database 504, the service management accounts and documentation component 400 determines whether a priority threshold has been met. If a priority threshold has been met, the service management accounts and documentation component 400 may effectuate a reprioritization by retrieving and manipulating data that is stored for the applicable service provider in the service search database 510 and reconveying the data to the service search database 510.

In one or more embodiments, the service payment management component 410 provides payment of a referral fee to a service consumer and/or a service provider for the referral of a service consumer or a service provider. A referral generally is identified by the provision of information by the referred party (e.g., the referred party's submission of a name and contact information for the referring party when queried during registration).

At any time, a logged-in service provider can, by making a request to the service management accounts and documentation component 400, review information available to that service provider through that service provider's service center hub service provider account. Data that is retrieved in response can include any or all data regarding the management of the service provider's services and/or service center hub service provider account (e.g., service session detail documents, billing information and invoices, marketing materials, work product, electronic files and folders, and management reports).

Some data, such as a service provider's service center hub accounting records, can be stored in the service management database 504 in a format that is easily exported and integrated into external billing software. Under one or more embodiments, at any time, a service provider can also submit documents, reports, and information in one or more media formats for account storage in the service management database 504. A service provider may as appropriate and legal, also manipulate data (e.g. reports, documents, information) and submit the manipulated data via the service management accounts and documentation means for storage in service management database 504. Under one or more embodiments, the same service center hub account management features, or an appropriate subset of such service center hub account management features, can also be provided to service consumers so that service consumers can, as appropriate and legal, manipulate and/or submit data in, one or more media formats to, as well as request and receive data, such as service session detail documents and invoices from the service management database 504. Under some embodiments, service providers and/or service consumers may also be able to access certain information by logging in to their respective service center hub user accounts and viewing their respective service center hub e-mail accounts using the service management accounts and documentation component 400. Also, under some embodiments, service consumers and/or service providers can contact customer service via the service management accounts and documentation component 400 (e.g. by e-mail, comment boxes, instant messaging, etc.) to convey questions, comments, suggestions and/or requests for assistance.

Additional information that can be made available on the service center hub of one or more embodiments of the present invention is advisory information. The advisory information can be separated, searched (whether by search engine, filtering, or other search means known to those skilled in the art), refined, identified, selected, solicited, and procured by category, subcategory, specification, and/or specific identification. In addition, the advisory information can be situated in the same visual vicinity as advertisements and/or sponsor information for goods and services pertaining to the category/subcategories and/or specifications and/or specific identifications addressed by the advisory information.

In addition, one or more service center hub embodiments of the present invention can provide a means through which mail order brides and/or grooms may be located and displayed utilizing search functions and/or lists that sort, displays, and/or categorizes the mail order brides and/or grooms on the basis of their resemblance to particular celebrities. In these embodiments, pictures of a mail order bride can be displayed alongside pictures of the celebrity that the bride supposedly resembles. Similarly, pictures of a mail order groom can be displayed alongside pictures of the celebrity that the groom supposedly resembles. The service payment management component 410 would manage the collection and/or allocation of fees for mail order bride and/or groom related purchases.

Another potential feature of the service center hub 200 under one or more embodiments of the present invention is the provisioning of barter services. Under one or more embodiments, the bartering service(s) may provide a venue where customers can interact, via real time and/or non-real time communication methods, written lists, postings, classifieds, and/or other written forums, to offer for bartering, services and goods. The service center hub's 200 bartering venue can include search functions and/or lists/links to separate, search for, identify and select and/or solicit and/or procure and/or receive the provision of particular services and/or goods from another party.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for facilitating interaction between service consumers and service providers via service center hub, comprising:
   a service session scheduling component that schedules a service session between a service consumer and a service provider;

a service management session delivery component capable of provisioning communication for the service session between the service consumer and the service provider; and a service payment management component that facilitates a first payment from the service consumer to the service provider for service provided during the service session, the first payment being based at least in part upon a duration of the service session, the service payment management component further facilitating a second payment from the service provider to a system account of a service center hub, a timing of the facilitating of the second payment being dependent upon a timing of the facilitating of the first payment to the service provider, wherein the facilitating of the first payment is performed by providing for the transacting of the first payment and the facilitating of the second payment is performed by providing for the transacting of the second payment, whereby the first payment passes from the service consumer to the service provider without the service center hub transacting the first payment, wherein the service session scheduling component, the service management session delivery component and the service payment management component are each stored on a machine readable medium and there are means for reading each said medium and carrying out scheduling of the service session in accordance with the service session scheduling component, carrying out communication of the service session in accordance with the service management session delivery component, and facilitating payment in accordance with the service payment management component.

2. A system as recited in claim 1, further comprising a search and selection component that provides a plurality of service provider data to the service consumer in response to receiving a search request from the service consumer, wherein the service provider is selected based on the plurality of service provider data.

3. A system as recited in claim 1, wherein the payment from the service consumer to the service provider and the payment from the service provider to the system account are completed in two online transactions.

4. A system as recited in claim 1, wherein the payment from the service consumer to the service provider and the payment from the service provider to the system account are completed in one online transaction.

5. A system as recited in claim 1, wherein the service management session delivery component provisions online real-time communication for the service session.

6. A system as recited in claim 1, wherein the service management session delivery component provisions online non-real time communication for the service session.

7. A system as recited in claim 1, wherein the service consumer is a service provider acting on behalf of a third party.

8. A system as recited in claim 1, wherein the service management session delivery component is further capable of tracking a period of time of the service session.

9. A system as recited in claim 8, wherein said duration of the service session is the period of time.

10. A system as recited in claim 9, wherein the period of time is a period of time during which the service provider participated in the service session.

11. A method for facilitating interaction between service consumers and service providers via service center hub, comprising the operations of:

scheduling a service session between a service consumer and a service provider;

provisioning communication for the service session between the service consumer and the service provider;

facilitating a first payment from the service consumer to the service provider for service provided during the service session, the first payment being based at least in part upon a duration of the service session; and facilitating a second payment from the service provider to a system account of a service center hub, a timing of the facilitating of the second payment from the service provider to the system account being dependent upon a timing of the facilitating of the first payment to the service provider, wherein the facilitating of the first payment is performed by providing for the transacting of the first payment and the facilitating of the second payment is performed by providing for the transacting of the second payment, whereby the first payment passes from the service consumer to the service provider without the service center hub transacting the first payment, wherein the scheduling of the service session, the provisioning communication for the service session, the facilitating of the first payment, and the facilitating of the second payment are performed electronically by using a processor of the service center hub.

12. A method as recited in claim 11, further comprising the operation of providing a plurality of service provider data to the service consumer in response to receiving a search request from the service consumer, wherein the service provider is selected based on the plurality of service provider data.

13. A method as recited in claim 11, wherein the payment from the service consumer to the service provider and the payment from the service provider to the system account are completed in two online transactions.

14. A method as recited in claim 11, wherein the payment from the service consumer to the service provider and the payment from the service provider to the system account are completed in one online transaction.

15. A method as recited in claim 11, wherein the communication for the service session is an online real-time communication for the service session.

16. A method as recited in claim 11, wherein the communication for the service session is an online non-real time communication for the service session.

17. A method as recited in claim 11, wherein the service consumer is a service provider acting on behalf of a third party.

18. A method as recited in claim 11, further comprising the operation of tracking a period of time of the service session.

19. A method as recited in claim 18, wherein said duration of the service session is the period of time.

20. A method as recited in claim 19, wherein the period of time is a period of time during which the service provider participated in the service session.

21. A computer program embodied on a computer readable medium, the computer program capable of facilitating interaction between service consumers and service providers via service center hub, comprising:

a service session scheduling component that schedules a service session between the service consumer and the service provider;

a service management session delivery component capable of provisioning communication for the service session between the service consumer and the service provider; and a service payment management component that facilitates a first payment from the service consumer to the service provider for service provided during the service session, the first payment being based at least in part upon a duration of the service session, the service payment management component further facilitating a second payment from the service provider to a system account of a service center hub, a timing of the facilitating of the second payment being dependent upon a timing of the facilitating of the first payment to the service provider, wherein the facilitating of the first payment is performed by providing for the transacting of the first payment and the facilitating of the second payment is performed by providing for the transacting of the second payment, whereby the first payment passes from the service consumer to the service provider without the service center hub transacting the first payment.

22. A computer program as recited in claim 21, wherein the payment from the service consumer to the service provider and the payment from the service provider to the system account are completed in two online transactions.

23. A computer program as recited in claim 21, wherein the payment from the service consumer to the service provider and the payment from the service provider to the system account are completed in one online transaction.

24. A computer program as recited in claim 21, wherein the service management session delivery component provisions online real-time communication for the service session.

25. A computer program as recited in claim 21, wherein the service management session delivery component provisions online non-real time communication for the service session.

26. A computer program as recited in claim 21, wherein the service consumer is a service provider acting on behalf of a third party.

27. A computer program as recited in claim 21, further comprising a search and selection component that provides a plurality of service provider data to the service consumer in response to receiving a search request from the service consumer, wherein the service provider is selected based on the plurality of service provider data.

28. A computer program as recited in claim 21, wherein the service management session delivery component is further capable of tracking a period of time of the service session.

29. A computer program as recited in claim 28, wherein said duration of the service session is the period of time.

30. A computer program as recited in claim 29, wherein the period of time is a period of time during which the service provider participated in the service session.

31. A computer program as recited in claim 21, wherein the service consumer requests the scheduling of the service session between the service consumer and the service provider, the service provider selected by the service consumer.

32. A computer program as recited in claim 21, wherein a third party requests the scheduling of the service session between the service consumer and the service provider, the service provider selected by the third party.

33. A computer program as recited in claim 32, further comprising a search and selection component that provides a plurality of service provider data to the third party in response to receiving a search request from the third party, wherein the service provider is selected by the third party based on the plurality of service provider data.

34. A computer program as recited in claim 21, wherein a payment by a third party on the service consumer's behalf is facilitated as said first payment from the service consumer to the service provider.

35. A computer program as recited in claim 21, wherein the service session is scheduled by the service session scheduling component between, and the communication for the service session is provisioned by the service management session delivery component between, a plurality of service consumers and at least one service provider.

36. A computer program as recited in claim 35, wherein the service payment management component facilitates at least one first payment from each of multiple service consumers from said plurality of service consumers to at least one service provider and wherein the service payment management component further facilitates at least one second payment from at least one service provider to the system account of the service center hub.

37. A computer program as recited in claim 35, wherein the first payment is determined based at least in part on a flat fee for a service scheduled for performance at least in part during said duration of the service session.

38. A computer program as recited in claim 35, wherein the service consumer is a service provider acting on behalf of a third party.

39. A computer program as recited in claim 35, wherein a payment by a third party on the service consumer's behalf constitutes said first payment from the service consumer to the service provider.

40. A computer program as recited in claim 21, wherein the second payment is based at least in part upon said duration of the service session.

41. A computer program as recited in claim 21, wherein the second payment is based at least in part upon a flat fee schedule.

42. A computer program as recited in claim 21, wherein the first payment is determined based at least in part on a flat fee for a service scheduled for performance at least in part during said duration of the service session.

43. A computer program as recited in claim 21, wherein the second payment is facilitated after the first payment is facilitated.

44. A computer program as recited in claim 21, wherein the first payment and the second payment are facilitated substantially simultaneously.

45. A computer program as recited in claim 28, wherein the service management session delivery component is capable of tracking a communication quality protocol corresponding to the period of time and the period of time is adjusted based upon the tracked communication quality protocol.

46. A computer program as recited in claim 45, wherein the payment from the service consumer to the service provider is based at least in part on the period of time adjusted based on the tracked communication quality protocol.

47. A computer program as recited in claim 21, wherein the service session scheduling component is utilized to schedule, the service session management delivery component is capable of provisioning communication for, and the service payment management component is utilized to facilitate said first payment and said second payment in connection with each of multiple service sessions supported by at least one service center hub, and wherein one service consumer is treated as the service consumer and one service provider is treated as the service provider in each of said multiple service sessions by the service session scheduling component, the service session management delivery component, and the service payment management component.

48. A method as recited in claim 11, wherein the service consumer requests the scheduling of the service session between the service consumer and the service provider, the service provider selected by the service consumer.

49. A method as recited in claim 11, wherein a third party requests the scheduling of the service session between the service consumer and the service provider, the service provider selected by the third party.

50. A method as recited in claim 49, further comprising the operation of providing a plurality of service provider data to the third party in response to receiving a search request from the third party, wherein the service provider is selected by the third party based on the plurality of service provider data.

51. A method as recited in claim 11, wherein a payment by a third party on the service consumer's behalf is facilitated as said first payment from the service consumer to the service provider.

52. A method as recited in claim 11, wherein the service session is scheduled between, and the communication for the service session is provisioned between, a plurality of service consumers and at least one service provider.

53. A method as recited in claim 52, further comprising steps of facilitating at least one first payment from each of multiple service consumers from said plurality of service consumers to at least one service provider and facilitating at least one second payment from at least one service provider to the system account of the service center hub.

54. A method as recited in claim 52, wherein the first payment is determined based at least in part on a flat fee for a service scheduled for performance at least in part during said duration of the service session.

55. A method as recited in claim 52, wherein the service consumer is a service provider acting on behalf of a third party.

56. A method as recited in claim 52, wherein in the step of facilitating the first payment, a payment by a third party on the service consumer's behalf constitutes said first payment from the service consumer to the service provider.

57. A method as recited in claim 11, wherein the second payment is based at least in part upon said duration of the service session.

58. A method as recited in claim 11, wherein the second payment is based at least in part upon a flat fee schedule.

59. A method as recited in claim 11, wherein the first payment is determined based at least in part on a flat fee for a service scheduled for performance at least in part during said duration of the service session.

60. A method as recited in claim 11, wherein the second payment is facilitated after the first payment is facilitated.

61. A method as recited in claim 11, wherein the first payment and the second payment are facilitated substantially simultaneously.

62. A method as recited in claim 18, wherein the processor further carries out the steps of tracking a communication quality protocol corresponding to the period of time and adjusting the period of time based upon the tracked communication quality protocol.

63. A method as recited in claim 62, wherein the payment from the service consumer to the service provider is based at least in part on the period of time adjusted based on the tracked communication quality protocol.

64. A method as recited in claim 11, wherein said scheduling, said provisioning of communication, and said facilitating of payment operations are utilized for each of multiple service sessions supported by at least one service center hub, and wherein one service consumer is treated as the service consumer and one service provider is treated as the service provider in said operations utilized for each of said multiple service sessions.

65. A system as recited in claim 1, wherein the service consumer requests the scheduling of the service session between the service consumer and the service provider, the service provider selected by the service consumer.

66. A system as recited in claim 1, wherein a third party requests the scheduling of the service session between the service consumer and the service provider, the service provider selected by the third party.

67. A system as recited in claim 66, further comprising a search and selection component that provides a plurality of service provider data to the third party in response to receiving a search request from the third party, wherein the service provider is selected by the third party based on the plurality of service provider data.

68. A system as recited in claim 1, wherein a payment by a third party on the service consumer's behalf is facilitated as said first payment from the service consumer to the service provider.

69. A system as recited in claim 1, wherein the service session is scheduled by the service session scheduling component between, and the communication for the service session is provisioned by the service management session delivery component between, a plurality of service consumers and at least one service provider.

70. A system as recited in claim 69, wherein the service payment management component facilitates at least one first payment from each of multiple service consumers from said plurality of service consumers to at least one service provider and wherein the service payment management component further facilitates at least one second payment from at least one service provider to the system account of the service center hub.

71. A system as recited in claim 69, wherein the first payment is determined based at least in part on a flat fee for a service scheduled for performance at least in part during said duration of the service session.

72. A system as recited in claim 69, wherein the service consumer is a service provider acting on behalf of a third party.

73. A system as recited in claim 69, wherein a payment by a third party on the service consumer's behalf constitutes said first payment from the service consumer to the service provider.

74. A system as recited in claim 1, wherein the second payment is based at least in part upon said duration of the service session.

75. A system as recited in claim 1, wherein the second payment is based at least in part upon a flat fee schedule.

76. A system as recited in claim 1, wherein the first payment is determined based at least in part on a flat fee for a service scheduled for performance at least in part during said duration of the service session.

77. A system as recited in claim 1, wherein the second payment is facilitated after the first payment is facilitated.

78. A system as recited in claim 1, wherein the first payment and the second payment are facilitated substantially simultaneously.

79. A system as recited in claim 8, wherein the service management session delivery component is capable of tracking a communication quality protocol corresponding to the period of time and the period of time is adjusted based upon the tracked communication quality protocol.

80. A system as recited in claim 79, wherein the payment from the service consumer to the service provider is based at least in part on the period of time adjusted based on the tracked communication quality protocol.

81. A system as recited in claim 1, wherein the service session scheduling component is utilized to schedule, the service session management delivery component is capable of provisioning communication for, and the service payment management component is utilized to facilitate said first payment and said second payment in connection with each of multiple service sessions supported by at least one service center hub, and wherein one service consumer is treated as the service consumer and one service provider is treated as the service provider in each of said multiple service sessions by the service session scheduling component, the service session management delivery component, and the service payment management component.

* * * * *